(12) United States Patent
Booher

(10) Patent No.: US 6,669,271 B2
(45) Date of Patent: Dec. 30, 2003

(54) SMOOTH SIDE BODY STRUCTURE AND METHOD

(75) Inventor: Howard Booher, Atwater, OH (US)

(73) Assignee: East Manufacturing Corporation, Randolph, OH (US)

( * ) Notice: Subject to any disclaimer, the term of this patent is extended or adjusted under 35 U.S.C. 154(b) by 0 days.

(21) Appl. No.: 10/177,728

(22) Filed: Jun. 21, 2002

(65) Prior Publication Data

US 2003/0011211 A1 Jan. 16, 2003

Related U.S. Application Data

(60) Provisional application No. 60/300,232, filed on Jun. 22, 2001.

(51) Int. Cl.$^7$ ................................................ B60J 7/00
(52) U.S. Cl. ........................................ 296/181; 296/191
(58) Field of Search ................................ 296/181, 191, 296/183, 29, 182, 24.2, 37.6; 220/1.5; 410/121

(56) References Cited

U.S. PATENT DOCUMENTS

| | | | | |
|---|---|---|---|---|
| 2,600,140 A | | 6/1952 | Torseth | |
| 3,848,920 A | * | 11/1974 | Linhart et al. | 296/106 |
| 4,145,080 A | * | 3/1979 | Miller et al. | 296/183 |
| 4,437,699 A | * | 3/1984 | Lewis et al. | 296/181 |
| 4,612,744 A | * | 9/1986 | Shamash | 52/220.1 |
| 4,787,670 A | * | 11/1988 | Bentz | 296/181 |
| 4,940,279 A | * | 7/1990 | Abott et al. | 296/181 |
| 5,026,112 A | * | 6/1991 | Rice | 296/181 |
| 5,041,318 A | * | 8/1991 | Hulls | 296/181 |
| 5,185,193 A | * | 2/1993 | Phenicie et al. | 220/1.5 |
| 5,345,737 A | * | 9/1994 | Latchinian | 52/280 |
| 5,403,062 A | * | 4/1995 | Sjostedt et al. | 296/181 |
| 5,449,081 A | * | 9/1995 | Sjostedt et al. | 220/1.5 |
| 5,553,906 A | * | 9/1996 | Kunz | 296/29 |
| 5,608,999 A | * | 3/1997 | McNamara | 52/275 |
| 5,613,726 A | * | 3/1997 | Hobbs et al. | 296/181 |
| 5,664,826 A | * | 9/1997 | Wilkens | 296/181 |
| 5,681,095 A | * | 10/1997 | Martin | 296/191 |
| 5,715,641 A | * | 2/1998 | Hall, Jr. | 52/578 |
| 5,741,042 A | * | 4/1998 | Livingston et al. | 296/181 |
| 5,791,726 A | * | 8/1998 | Kaufman | 296/181 |
| 5,860,693 A | * | 1/1999 | Ehrlich | 296/181 |
| 5,876,089 A | * | 3/1999 | Ehrlich | 296/181 |
| 5,934,741 A | * | 8/1999 | Beukers et al. | 296/181 |
| 5,938,274 A | * | 8/1999 | Ehrlich | 296/181 |
| 5,992,117 A | * | 11/1999 | Schmidt | 296/181 |
| 5,997,076 A | * | 12/1999 | Ehrlich | 296/181 |
| 6,095,715 A | * | 8/2000 | Hulls | 403/403 |
| 6,161,347 A | * | 12/2000 | Yu et al. | 52/220.7 |
| 6,199,939 B1 | * | 3/2001 | Ehrlich | 296/181 |
| 6,224,125 B1 | * | 5/2001 | McCormack | 296/181 |
| 6,224,142 B1 | * | 5/2001 | McCormack | 296/181 |
| 6,237,989 B1 | * | 5/2001 | Ammerlaan et al. | 296/191 |
| 6,290,285 B1 | * | 9/2001 | McCormack | 296/181 |
| 6,349,988 B1 | * | 2/2002 | Foster et al. | 296/181 |
| 6,412,854 B2 | * | 7/2002 | Ehrlich | 296/191 |
| 6,446,396 B1 | * | 9/2002 | Marangoni et al. | 52/36.1 |
| 6,497,451 B1 | | 12/2002 | Jones et al. | |
| 6,513,297 B2 | * | 2/2003 | Kloepfer | 52/588.1 |
| 2002/0109377 A1 | * | 8/2002 | Ehrlich | 296/181 |

FOREIGN PATENT DOCUMENTS

| | | | |
|---|---|---|---|
| CA | 2097340 | | 6/1997 |
| EP | 0 079 068 | * | 5/1983 |

* cited by examiner

*Primary Examiner*—Kiran Patel
(74) *Attorney, Agent, or Firm*—Hahn Loeser & Parks, LLP; Michael H. Minns

(57) ABSTRACT

A smooth side trailer body or body structure comprised of a plurality of extruded panel members positioned adjacent one another. The extruded panels are arranged perpendicular to the floor of a trailer. The panels are held to the floor by a bottom rail. A top rail portion may be used to hold the panels together to form a more rigid wall.

14 Claims, 5 Drawing Sheets

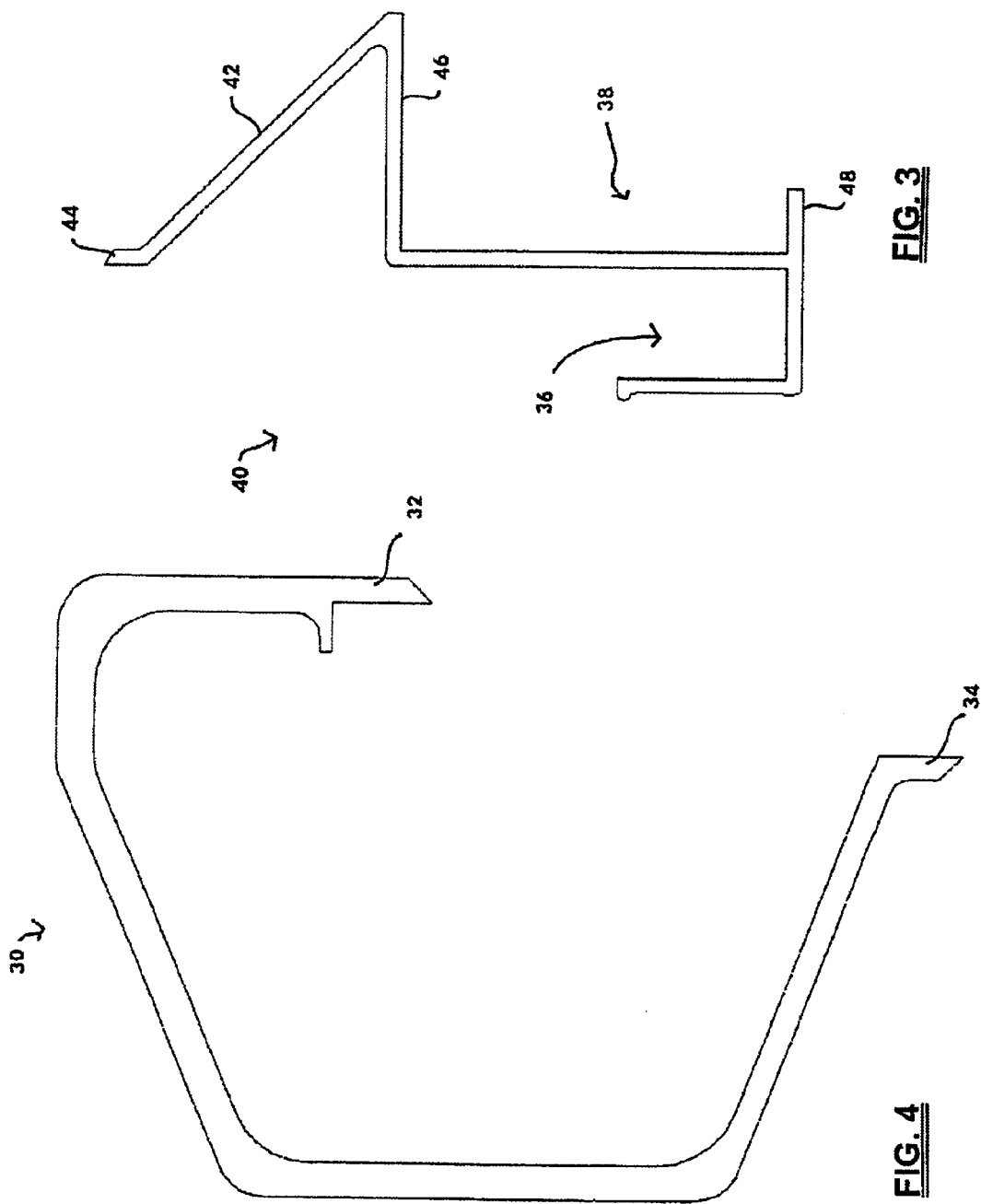

SMOOTH SIDE BODY STRUCTURE AND METHOD

This application claims priority from U.S. application Ser. No. 60/300,232, filed Jun. 22, 2001.

TECHNICAL FIELD

The present invention is directed to a smooth side trailer and body structure having walls formed of interlocking extruded aluminum panels and the method of making the same. Panels are aligned vertically adjacent to one another, with at least one female receiving portion in one panel engaging at least one male portion an adjacent panel. Adjacent panels form smooth side walls of a trailer.

BACKGROUND

Dump trailers, dump bodies, tipper trailers and walking floor trailers (bulk commodity trailers/bodies), traditionally have been produced in various lengths and capacities and consist generally of a chassis formed principally of one or more I-beams and a plurality of cross frame members joining the same with ground engaging wheel assemblies located under one end of the chassis and retractable support gear situated inwardly of the other end. Dump body comprising a floor structure incorporating longitudinal and cross frame members and a floor thereon with side walls and a front end wall secured thereto. The body is pivotally mounted on the chassis adjacent to the rear end thereof and a hoist, usually hydraulically actuated, is positioned between the front end of the dump body to elevate the same. While a variety of metallic materials have been employed to fabricate dump bodies, light weight and high strength metals, such as aluminum and various alloys thereof (hereafter collectively "Aluminum"), have become the favored manufacturing stock because they make possible production of trailers/bodies having low "empty weight" and optimum payload potential.

Aluminum floor, side wall and other components have been produced for dump bodies; however, such components have largely taken the form of either rolled sheet metal and/or a variety of extruded members which were solid throughout. Additionally, such dump body components have typically been joined to one another by known arc welding techniques which not only require highly skilled welding personnel and considerable quantities of energy and consumable materials, but also are less than ideally suited for Aluminum components. In addition, the walls formed by these materials and processes in order to be structurally sound did not form smooth walls. The walls typically utilize reinforcing members at spaced apart intervals along the length of the wall, forming a serrated appearance, which increases wind resistance. High wind resistance and heavy weight increases travel time and fuel consumption in use of the trailer or body.

Thus, a need exists for a trailer/body structure that, in addition to being structurally sufficient to accommodate desired loads and uses, like those sheet metal and/or extruded solid forms now commonly employed, are even lighter in weight and have smooth walls. In addition, it would be beneficial to provide such a trailer which does not require substantial amounts of support structures welded to the inside walls which take up valuable capacity. It would also be desirable to form the trailer or body to have increased capacity for use in handling larger volumes of materials where the above desired characteristics would be even more important.

SUMMARY

The present invention provides a body structure wherein the side walls of the trailer body or body are comprised of a plurality of lightweight, high strength extruded metal components which provide smooth outer walls of the trailer body. These and other advantages are provided by a trailer comprising a top rail, a bottom rail, and a plurality of hollow, extruded wall panels positioned vertically adjacent one another wherein the plurality of hollow, extruded wall panels is secured at one end to the top rail and at the opposite end to the bottom rail. Each wall panel comprises an inside wall and an outside wall connected to each other by a first end wall, a second end wall, and at least one intermediate wall. The first end wall includes a groove that extends along the length of the panel between the top rail and the bottom rail and the second end wall includes a projection that extends along the length of the panel between the top rail and the bottom rail such that the projection of the second wall matingly engages the first wall of an adjacent wall panel. The outside walls of the plurality of wall panels form a smooth exterior trailer wall surface.

These and other advantages are also provided by a method of constructing a trailer comprising the steps of: a) providing a bottom rail having a wall engaging portion and a floor engaging portion; b) attaching the floor engaging portion to a floor of the trailer; c) providing a plurality of extruded hollow wall panels wherein each wall panel comprises an inside wall and an outside wall connected to each other by a first end wall, a second end wall, and at least one intermediate wall and the first end wall includes a groove that extends along the length of the panel and the second end wall includes a projection which that extends along the length of the panel; d) attaching the plurality of wall panels to each other by positioning the projection of the second end wall of a wall panel into the groove of the first end wall of an adjacent wall panel; e) inserting and securing the plurality of interconnected wall panels into the wall engaging portion of the bottom rail; and f) attaching a top rail over the plurality of interconnected wall panels.

BRIEF DESCRIPTION OF THE DRAWINGS

FIG. 3 is a cross sectional view of a bottom rail of a trailer in accordance with the present invention.

FIG. 4 is a cross sectional view of a top rail, which connects the extruded panels to the floor of the trailer in the present invention, which connects the extruded panels to the floor of the trailer.

DETAILED DESCRIPTION OF THE INVENTION

Figure 1:
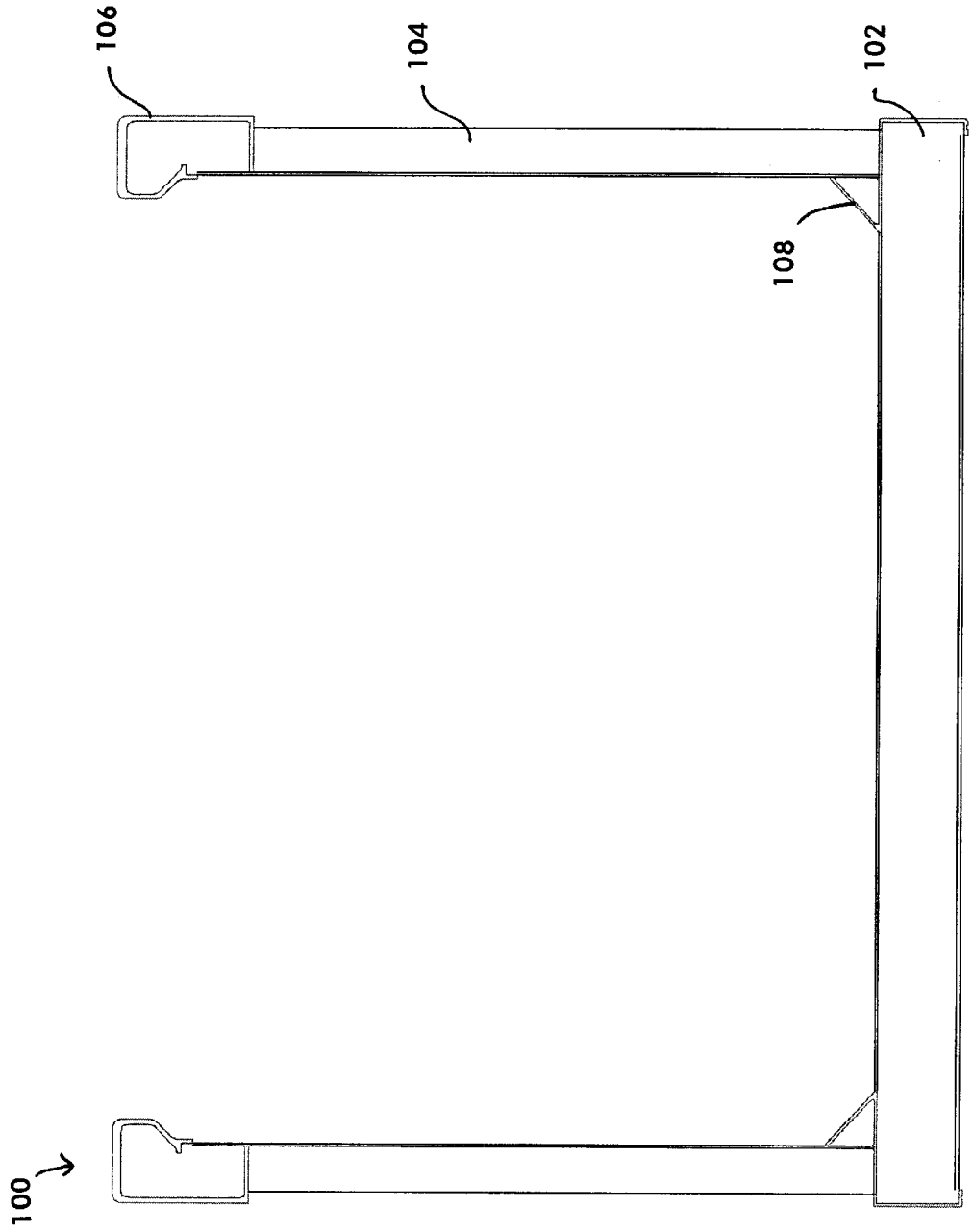
FIG. 1 is a cross sectional view of prior art trailer floor and walls.

The present invention will be described herein in reference to the attached figures. It should be understood that although specific embodiments are shown in the drawings and described herein, variations of these embodiments are clearly within the scope of the present invention.

In the following description, "inside" refers to the surface of the body structure walls facing the cargo holding area of the body; "outside" refers to the direction away from the cargo holding area of the body.

FIG. 1 illustrates a cross section of a prior art trailer 100. Prior art bodies are comprised of a floor 102. Side walls 104 were welded to the floor 102 at a bottom portion and then supported by a brace 108, which was welded to both the floor 102 and the wall 104. A top rail 106 was positioned over the top portion of the wall and welded thereto. The prior art walls were generally in the form of either rolled sheet metal and/or a variety of extruded members which were solid throughout. The components were typically joined to one another by arc welding techniques which not only require highly skilled welding personnel and considerable quantities of energy and consumable materials, but also are less than ideally suited for Aluminum components.

Figure 6:
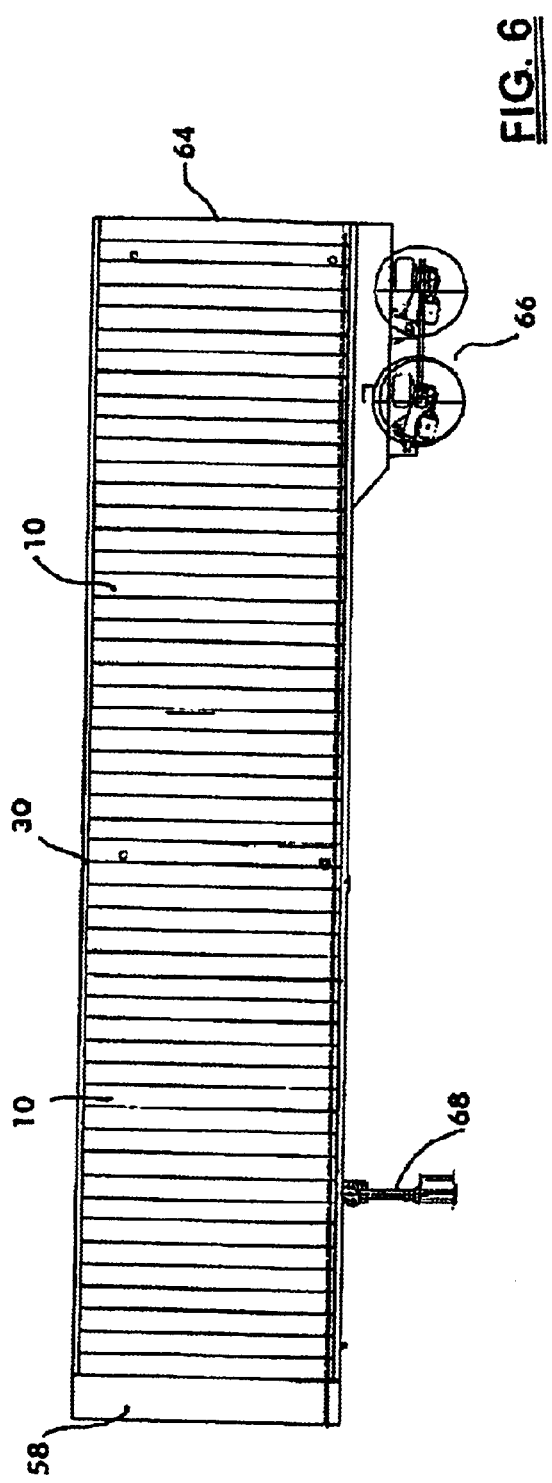
FIG. 6 is a side view of a first embodiment of a smooth side tipper trailer in accordance with the present invention.

The body components of the present invention are shown in FIGS. 2–8. FIG. 6 shows a typical tipper-type trailer. Tipper trailers are constructed of a chassis (not shown), having one or several spaced parallel I-beams (not shown) with cross frame members therebetween (not shown) and ground engaging wheel assemblies 66 below the back end of the chassis. The trailer further comprises a body structure which includes a floor member or assembly 60 positioned on a plurality of spaced cross frame members (not shown). The floor member 60 supports the side walls, which are comprised of a plurality of adjacent extruded panels 10. The back end of the tipper trailer is designated 64. The back end of the trailer 64 may have an opening through which cargo material in the trailer body will move by gravity when the tipper trailer is elevated. In the alternative, tipper trailers may be configured to be lifted by a tipping machine and inverted such that material will move out of the trailer through the back end 64 or another opening. Those skilled in the art will observe that an opening at the back end of the tipper body is usually closed with a pivotal tail gate and that the front end or bulkhead of the trailer body 58 is provided with the usual front wall typically constructed of a sheet material to join the side walls making an enclosed space. It should be understood that various trailer constructions maybe used with the inventive wall and assembly configurations described herein.

Figure 2:
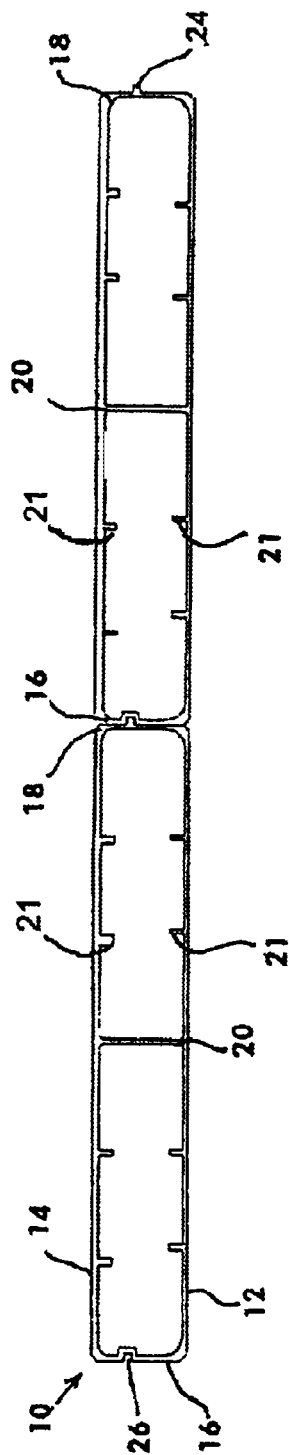
FIG. 2 is a top view of a portion of a smooth wall formed by extruded panels in accordance with the present invention.

In the present invention, the walls of the trailer are made from a plurality of extruded panels 10 arranged vertically or horizontally and adjacent to one another. A top view of two extruded panels 10 positioned adjacent to one another is shown in FIG. 2. The extruded panels are preferably made of extruded aluminum or another metal, which provides sufficient durability to withstand carrying of cargo as well as contact with extreme environmental elements. The length of the panels is variable depending on the desired height of the trailer walls and body configuration. One of the only limitations on the size of the panel is the capacity of an extruding machine used to make the panels. In one embodiment of the present invention, the hollow spaces in the wall panels 10 are filled with an insulating material 21 such as foam or fiberglass insulation. The insulating material 21 is used to increase the strength of the panels and/or to provide some hot or cold thermal insulation for the body's cargo. In the alternative, solid extruded aluminum wall panels are within the scope of the present invention.

As shown in FIG. 2, each panel 10 is typically hollow and has an inside wall 12, an outside wall 14, and two end walls 16 and 18. Each panel also has intermediate walls 20, which connect the inside wall 12 and outside wall 14 between the two end walls 16 and 18. The intermediate walls 20, also serve to reinforce the inside 12 and outside 14 walls. The number of intermediate walls can be varied based on the width of the extruded panels 10 and the need for additional reinforcement in the panel 10. The wall panels 10 may also comprise reinforcing ribs 21 shown in FIG. 2 projecting from the inside wall 12 toward the outside wall 14 or vice versa. The reinforcing ribs 21 provide additional strength and rigidity to the wall panels 10.

Figure 5:
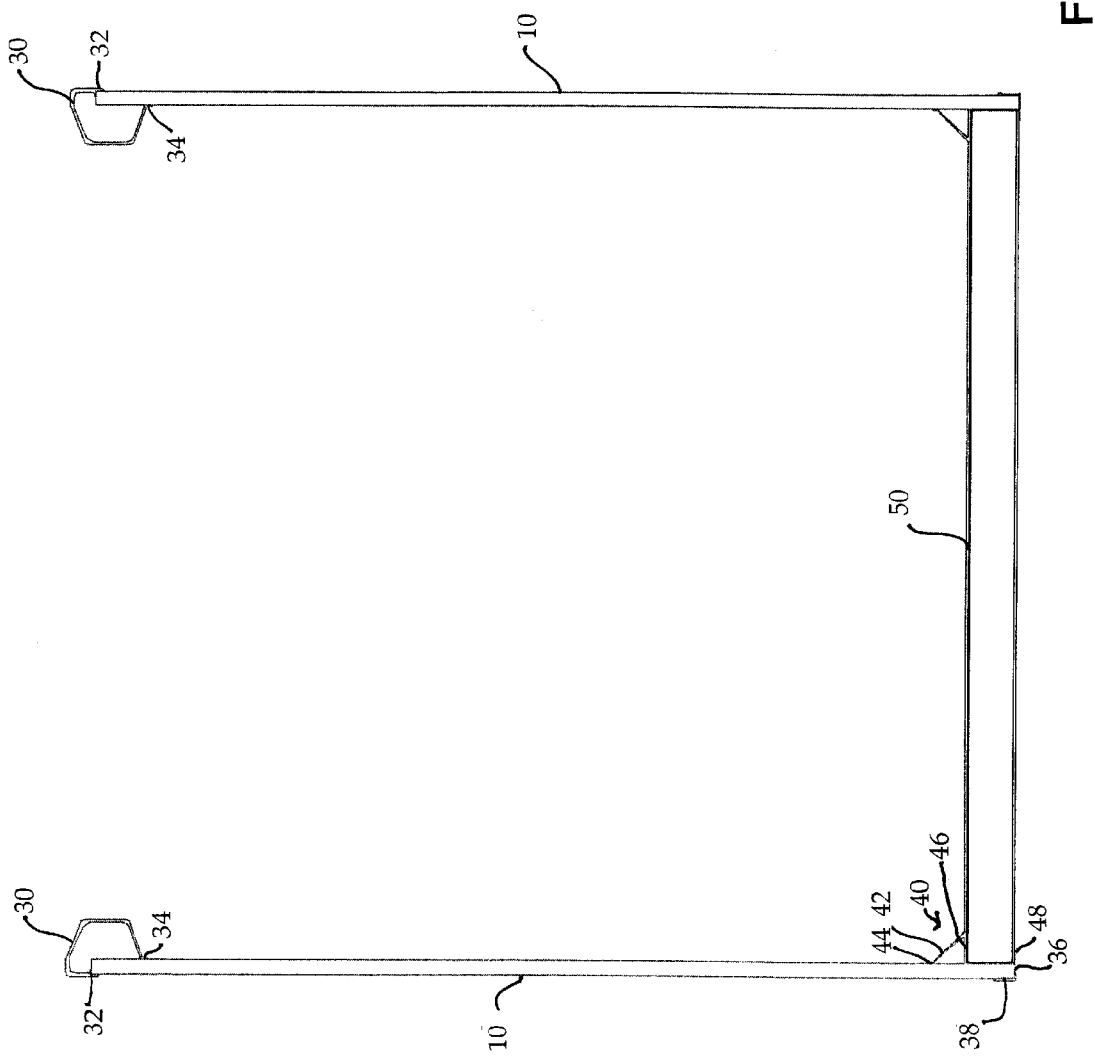
FIG. 5 is a cross sectional view of a trailer floor and walls in accordance with the present invention.

A first end wall 16 is equipped with a groove 26 that extends along the length of the panel between the top rail 60 and bottom rail 40 of trailer (FIG. 5). A second end wall is equipped with a ridge or flange 24. The flange 24 also extends along the length of the panel. The flange 24 and groove 26 correspond to one another and the groove is slightly larger than the ridge so that the ridge of one panel 10 can be inserted into the groove 26 of another panel when the panels are mounted adjacent one another. Seals are created at the flange and groove connection between the two panels. In addition, the flange and groove are positioned on the sides of the extruded panels such that when the panels are positioned adjacent to one another and fit together, the side walls of the body structure is smooth.

It is contemplated by the present invention that the panels may lock together simply by the action of the flange of one panel engaging the groove of a second panel. Alternatively, it should be understood that adhesives may be placed on the sides of the panels between two adjacent panels where the flange and groove engage or the seam between panels can be welded. Other suitable methods of connecting panels to one another or combinations thereof are contemplated. It is also contemplated by the present invention that no flange or groove be present on the panels and that the panels are substantially smooth on all sides. The adjacent panels could be placed adjacent to one another within the bottom rail portion (described in relation to FIG. 3) and secured into place by frame members at the front 58 and rear 64 of the body and/or the top rail member (described in relation to FIG. 4). Furthermore, the smooth panels could be secured together by adhesive and/or welding between adjacent end walls of two panels.

The panels are secured to the floor by the bottom rail apparatus shown in FIGS. 3 and 5 generally designated 40. The bottom rail comprises a wall engaging portion 36, a floor engaging portion 38, and a reinforcement portion 42. The width of the wall engaging region 36 is slightly larger than the width of extruded panels 10 so that extruded panels 10 fit tightly into the wall engaging portion. The floor engaging portion 38 has a lower member 48 which extends below the floor and may be welded thereto. The floor engaging portion 38 also has an upper member 46 which extends a short distance along the surface of the floor 50. The bottom rail also has a reinforcement portion 42 which extends upwards at an angle approximately 45° from the floor. The reinforcement portion 42, as shown in FIG. 5, engages the side wall panels when mounted with the floor engaging portion 38 to form a triangle between the wall 10 and the floor 50. The reinforcement portion also has a flat end portion 44 which is connected, such as by welding or adhesive, to the extruded wall panels 10. The bottom rail may be welded to the floor 50 or wall panels 10 at various places. The reinforcement portion 42 is integral to the bottom rail to provide structural integrity in association with the wall as formed from the plurality of wall panels 10, and yet greatly simplifies manufacturing and reduces labor and materials in the construction. The provision of the reinforcing portion 42 may also allow thinner wall panels 10 to be used while providing the desired structural characteristics, but it should be evident that the characteristics of the wall panels and/or bottom rail 40 could be modified to yield desired structural integrity without the use of the reinforcement portion 42, and thus this portion would not be necessary.

Prior to engagement with the bottom rail 40, the wall panels 10 formed into a wall assembly typically will have some flexibility due to its construction form a plurality of individual panels 10. Once the extruded panels 10 are positioned adjacent one another in the bottom rail 40, a substantially rigid wall is formed. To further rigidify the wall assembly and to cap the top of the wall, a top rail member 30 as shown in FIG. 4 may be positioned over the top of the extruded panels to further secure the panels together to form a rigid wall. The top rail member 30 is positioned over the top of the extruded panels as shown in FIG. 5, with ends 32 and 34 being connected, such as by welding or adhesive to the respective outer and inner surfaces of the wall panels 10. The top rail member 30 adds additional structural rigidity to the wall assembly and along with the bottom rail 40 tie the walls into the front bulkhead and rear tailgate as well as the floor of the body to form a rigid body having the desired structural characteristics. In the prior art, due to the characteristics of the walls, it many times would be necessary to provide reinforcing tie bars at spaced intervals along the length of the trailer, which extend between the walls. With the wall construction according to the invention, the use of such tie bars may be eliminated, thereby allowing access to the interior of the trailer through the entire top opening along the length of the body.

Figure 7:
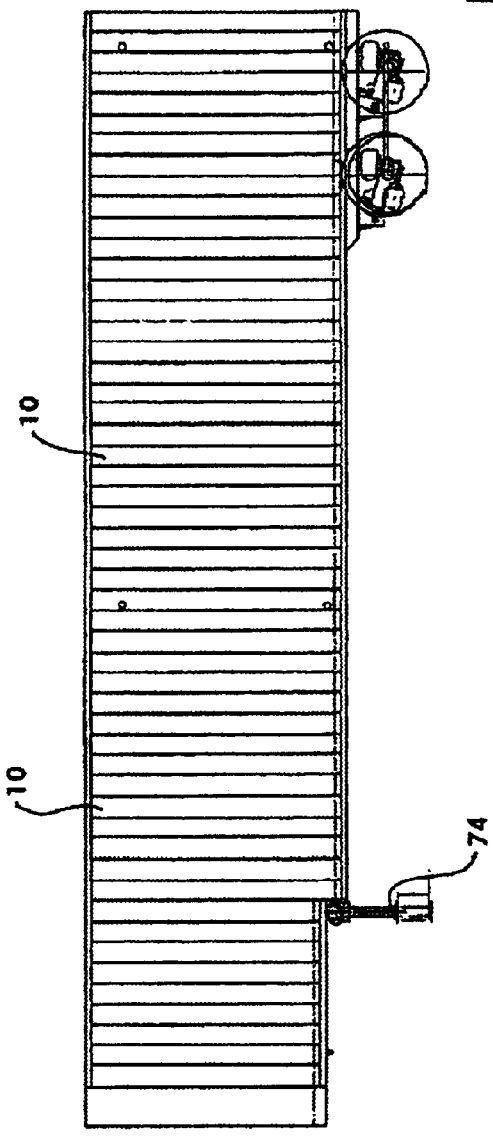
FIG. 7 is a side view of a second embodiment of a smooth side tipper trailer in accordance with the present invention.
Figure 8:
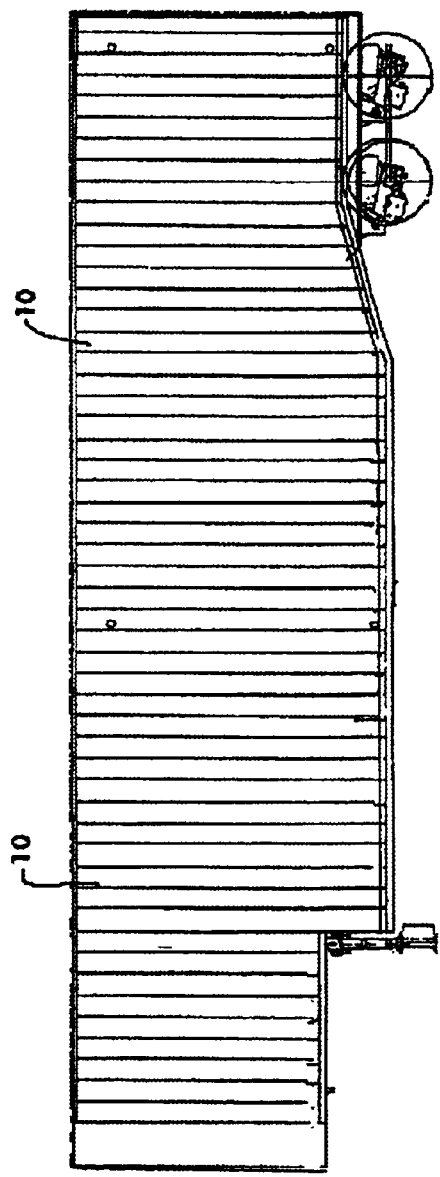
FIG. 8 is a side view of a third embodiment of a smooth side tipper trailer in accordance with the present invention.

The panel arrangement also allows for different body configurations to be constructed. As shown in FIGS. 3 and 4, the volume of the body can be increased by varying the shape of the floor 70, 82 (FIGS. 7–8). In FIG. 7, shorter panels are used at a front portion of the body in front of the landing gear member 74. The floor 70 to the rear of the landing gear is dropped to lower creating a larger volume body. Longer vertical extruded panels are used at the portion along the length of the floor where the floor has been lowered.

As shown in FIG. 8, various length panels can be used with another type of variable height floor 82. Longer panels must be used in the portion of the body wall where the distance between floor and the desired height of the body is the greatest. This creates a body having a greater volume than the body shown in FIGS. 6 and 7, limited only by the width of the extruded vertical panels and the capacity of the trailer floor, axles or landing gear.

As previously discussed and in reference to FIGS. 2–8, the method of constructing a trailer comprises the following steps. First, providing a bottom rail having a wall engaging portion and a floor engaging portion. Secondly, attaching the floor engaging portion to a floor of the trailer. Next, providing a plurality of extruded hollow wall panels wherein each wall panel comprises an inside wall and an outside wall connected to each other by a first end wall, a second end wall, and at least one intermediate wall and the first end wall includes a groove that extends along the length of the panel and the second end wall includes a projection which that extends along the length of the panel. Another step involves attaching the plurality of wall panels to each other by positioning the projection of the second end wall of a wall panel into the groove of the first end wall of an adjacent wall panel. This step can be supplemented by applying an adhesive between the second end wall of a wall panel and the first end wall of an adjacent wall panel and/or welding a seam on an interior seam between the plurality of wall panels. Next, inserting and securing the plurality of interconnected wall panels into the wall engaging portion of the bottom rail. Prior to the last step, the method may include an optional step of filling the plurality of extruded hollow wall panels with an insulating material. Lastly, attaching a top rail over the plurality of interconnected wall panels.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A trailer comprising:

a floor;

a monolithic top rail;

a monolithic bottom rail;

a plurality of vertically extending monolithic hollow, extruded wall panels positioned vertically adjacent one another wherein the plurality of hollow, extruded wall panels is secured at one end to the top rail and at the opposite end to the bottom rail;

wherein each wall panel comprises an inside wall and an outside wall connected to each other by a first end wall, a second end wall, and at least one intermediate wall;

the first end wall includes a groove that extends along the length of the panel between the top rail and the bottom rail;

the second end wall includes a projection that extends along the length of the panel between the top rail and the bottom rail;

wherein the projection of the second end wall matingly engages the groove of the first end wall of an adjacent wall panel;

wherein the bottom rail includes: a wall engaging portion and a floor engaging portion, and a bracing portion; wherein the wall engaging portion is at least partially U-shaped to matingly support the wall panels; wherein the bracing portion extends upward at an angle approximately 45° from the floor engaging portion and includes a flat end portion formed generally parallel to the wall panels and connected to the plurality of wall panels; wherein the floor engaging portion attaches to the top of the floor of the trailer and includes a lower member which extends below a floor of the trailer and is attached to the bottom of the floor of the trailer;

wherein the outside walls of the plurality of wall panels form a smooth exterior trailer wall surface.

2. The trailer of claim 1, wherein an adhesive is positioned between adjacent wall panels.

3. The trailer of claim 1, wherein the plurality of hollow, extruded wall panels are at least partially filled with an insulating material.

4. The trailer of claim 1, wherein the inside wall comprises at least one stiffening rib extending only partially toward the outside wall of the wall panel.

5. The trailer of claim 1, wherein the outside wall comprises at least one stiffening rib extending only partially toward the inside wall of the wall panel.

6. The trailer of claim 1, wherein the top rail and bottom rail are made of an extruded lauminum alloy.

7. A wall for a trailer comprising:

a plurality of hollow, extruded wall panels positioned vertically adjacent one another;

wherein each wall panel comprises an inside wall and an outside wall connected to each other by a first end wall, a second end wall, and at least one intermediate wall;

wherein the inside wall or the outside wall comprises at least one reinforcing rib extending part wall toward the other wall said at least one stiffening rib having a free end, the free end being spaced away from the other wall;

wherein the first end wall includes a groove that extends along the length of the panel between ends of the first end wall;

wherein the second end wall includes a projection which that extends along the length of the panel between ends of the second end wall;

wherein the projection of the second end wall matingly engages the groove of the first end wall of an adjacent wall panel;

wherein the outside walls of the plurality of wall panels form a smooth exterior trailer wall surface.

8. The wall for a trailer of claim 7, wherein an adhesive is positioned between adjacent wall panels.

9. The wall of a trailer of claim 7, wherein the plurality of hollow, extruded wall panels are at least partially filled with an insulating material.

10. The wall of a trailer of claim 7, wherein adjacent wall panels are welded together along an interior seam between the adjacent panels.

11. A method of constructing a trailer comprising the following steps:

providing a floor;

providing a plurality of vertically extending monolithic extruded hollow wall panels wherein each wall panel comprises an inside wall and an outside wall connected to each other by a first end wall, a second end wall, and at least one intermediate wall, the first end wall including a groove that extends along the length of the panel, the second end wall including a projection which that extends along the length of the panel;

providing a bottom rail comprising: a first U-shaped section oriented vertically upward, the wall panels lower end being positioned within the first U-shaped section oriented vertically upward, the wall panels lower end being positioned within the first U-shaped section; a second U-shaped section oriented horizontally, the floor being positioned within the second U-shaped section; and an angle section extending from the second U-shaped section towards the wall panels positioned within the first U-shaped section, a free end of the angle section engaging the wall panels inside wall;

attaching the bottom rail second U-shaped section to the floor of the trailer;

attaching the plurality of wall panels to each other by positioning the projection of the second end wall of a wall panel into the groove of the first end wall of an adjacent wall panel;

inserting and securing the plurality of interconnected wall panels into the first U-shaped portion of the bottom rail;

providing a top rail comprising a first wall panel engaging flange; and a second wall panel engaging flange, the second wall panel engaging flange being vertically lower than the first wall panel engaging flange; and attaching the top rail over the plurality of interconnected wall panels, the top rail first wall panel engaging flange engaging the wall panels outside wall and the second wall panel engaging flange engaging the wall panels inside wall.

12. The method of claim 11, wherein the step of attaching the plurality of wall panels to each other includes the step of applying an adhesive between the second end wall of a wall panel and the first end wall of an adjacent wall panel.

13. The method of claim 11, wherein the step of attaching the plurality of wall panels to each other includes the step of welding a seam on an interior seam between the plurality of wall panels.

14. The method of claim 11, wherein prior to the step of attaching a top rail over the plurality of interconnected wall panels, filling the plurality of extruded hollow wall panels with an insulating material.

* * * * *